United States Patent

[11] 3,598,910

[72] Inventors Armand M. Johnston
Webster;
Marion G. Wood, Rochester; James D. Lehner, Rochester, all of, N.Y.
[21] Appl. No. 737,441
[22] Filed June 17, 1968
[45] Patented Aug. 10, 1971
[73] Assignee Xerox Corporation
Rochester, N.Y.

[54] SELF-TEST APPARATUS FOR FACSIMILE GRAPHIC COMMUNICATION SYSTEM
15 Claims, 4 Drawing Figs.

[52] U.S. Cl. .......... 178/6.6 R, 178/6.6 A, 346/74 ES
[51] Int. Cl. .......... H04n 1/06, H04n 1/32, H04n 5/58
[50] Field of Search .......... 178/6, 6 TT, 5.4, 6.6, 6.6 A; 346/74 ES, 74 P, 74 CR; 179/110—145

[56] References Cited
UNITED STATES PATENTS
3,064,077 11/1962 Cary .......... 178/6.6
OTHER REFERENCES
Publication I Facsimile by Charles R. Jones, 1949, pp. 75—77

*Primary Examiner*—Bernard Konick
*Assistant Examiner*—Steven B. Pokotilow
*Attorneys*—James J. Ralabate, John E. Beck and Franklyn C. Weiss

ABSTRACT: A facsimile graphic communication system wherein an operator may test the transmitting and receiving functions of a transceiver by utilizing only the equipment associated with the transceiver. A self-test feature is provided whereby a transceiver unit is enabled to transmit to itself for testing the transmitting and receiving functions. A special test document is provided where the transceiver scans part of the document and prints on another part of the document, thereby testing both the transmit and receive functions without utilizing another transceiver unit and associated transmission line.

INVENTORS
ARMAND M. JOHNSTON
MARION G. WOOD
JAMES D. LEHNER
BY Franklyn C. Weiss
ATTORNEY

SELF-TEST APPARATUS FOR FACSIMILE GRAPHIC COMMUNICATION SYSTEM

BACKGROUND

As is known in a normal facsimile system, a document or the like to be transmitted is scanned at a transmitting station to convert information on the document into a series of electrical signals. These video signals, or carrier modulated signals corresponding thereto, are then coupled to the input of a communication link interconnecting the transmitter with a receiver. At the receiving location, the video signals, in conjunction with suitable synchronizing signals, selectively control the actuation of appropriate marking means to generate a facsimile of the document transmitted.

One such facsimile system is presently being marketed by the Xerox Corporation in Rochester, New York. This system, marketed under the trademark Telecopier, is a transceiver unit, which is capable of transmitting and receiving information on a document or the like over commercial telephone lines. That is, at a transmitting location, a document to be transmitted, is loaded into the Telecopier transceiver, appropriate voice contact is made with the receiving location where a similar Telecopier transceiver is located, a recording medium is loaded into the receiving Telecopier transceiver, appropriate signal couplings are made, and transmission of the document from the transmitting location is made to the transceiver at the receiving location. Because of the transceiver capabilities of the Telecopier, the receiving location can, upon proper notification to the transmitting location, reverse the functions of the separate locations and transmit a document to the original transmitting unit now operating as a receiver.

The Telecopier transceiver as presently marketed utilizes the common carrier telephone lines extensively found in all countries of the world. Whenever a ordinary telephone conversation can be established between two standard telephone units anywhere in the world, similarly can transmission of a facsimile document be made as long as each location has the Telecopier transceiver and associated transmission line coupling apparatus. Because of the fact that rarely are two Telecopier transceivers positioned at the same location, testing heretofore of the operation of a Telecopier transceiver was not possible without establishing a telephone communication to another Telecopier transceiver location where a similar Telecopier transceiver was located. Normal testing of a machine at periodic intervals, or upon testing of a particular transceiver upon possible malfunction, becomes burdensome and expensive, because another location must be contacted and a document transmitted and received in order to test both transmitting and receiving apparatus within a single Telecopier transceiver.

OBJECTS

It is, accordingly, an object of the present invention to provide a test capability within a single facsimile transceiver to test both transmitting and receiving functions.

It is another object of the present invention to provide procedures and apparatus for testing both the transmitting and receiving functions within a single facsimile transceiver without the need of communicating with another transceiver of similar type.

It is another object of the present invention to provide for the self-testing of both transmitting and receive functions of a facsimile transceiver at a single location.

It is another object of the present invention to test a facsimile transceiver at a single location without the need of transmitting to and receiving from another facsimile transceiver at a remote location.

BRIEF SUMMARY OF THE INVENTION

In accomplishing the above and other desired aspects of the present invention, applicants have invented novel methods and improved apparatus for providing a self-test capability for a facsimile transceiver without the need of communicating with another like transceiver at a remote location. Provisions are made within a facsimile transceiver to allow both scanning and printing operations to occur simultaneously. With the aid of a specially prepared document and recording medium printing set, the transceiver can scan from and print on the special printing set at the same time. Thus, an operator merely by loading the transceiver with the special test document, both transmitting and receiving functions within the transceiver can be tested.

The above-mentioned Telecopier transceiver utilizes a rotating turret type of scanner. In the transmit mode, optical means are utilized for scanning and detecting the information printed on a document or the like. In the print mode, an impact type of printing operation is utilized. That is, when the transceiver is utilized as a receiver, a print document commonly termed a carbon set comprising a sheet of carbon paper attached to a sheet of white paper, is fed into the machine. In response to the received information the print head is energized and accordingly marks the carbon paper and thus a facsimile of the document is made on the white sheet. A special print set is used for the self-test procedure, which utilizes a self-test label that is attached to one side of the longitudinal axis of the carbon set. Thus, as the optical read head scans past the special label, the print head mounted adjacent to the scan head on the rotating turret, thus providing transceiver capability, impacts the carbon paper in accordance with the scan information provided by the optical read head. In this way, an operator can check the output reproduction of the self-test label and determine whether the transceiver is operating in optimum fashion.

DESCRIPTION OF THE DRAWINGS

For a more complete understanding of the invention, reference may be had to the following detailed description in conjunction with the drawings wherein.

DETAILED DESCRIPTION OF THE INVENTION

Figure 1:
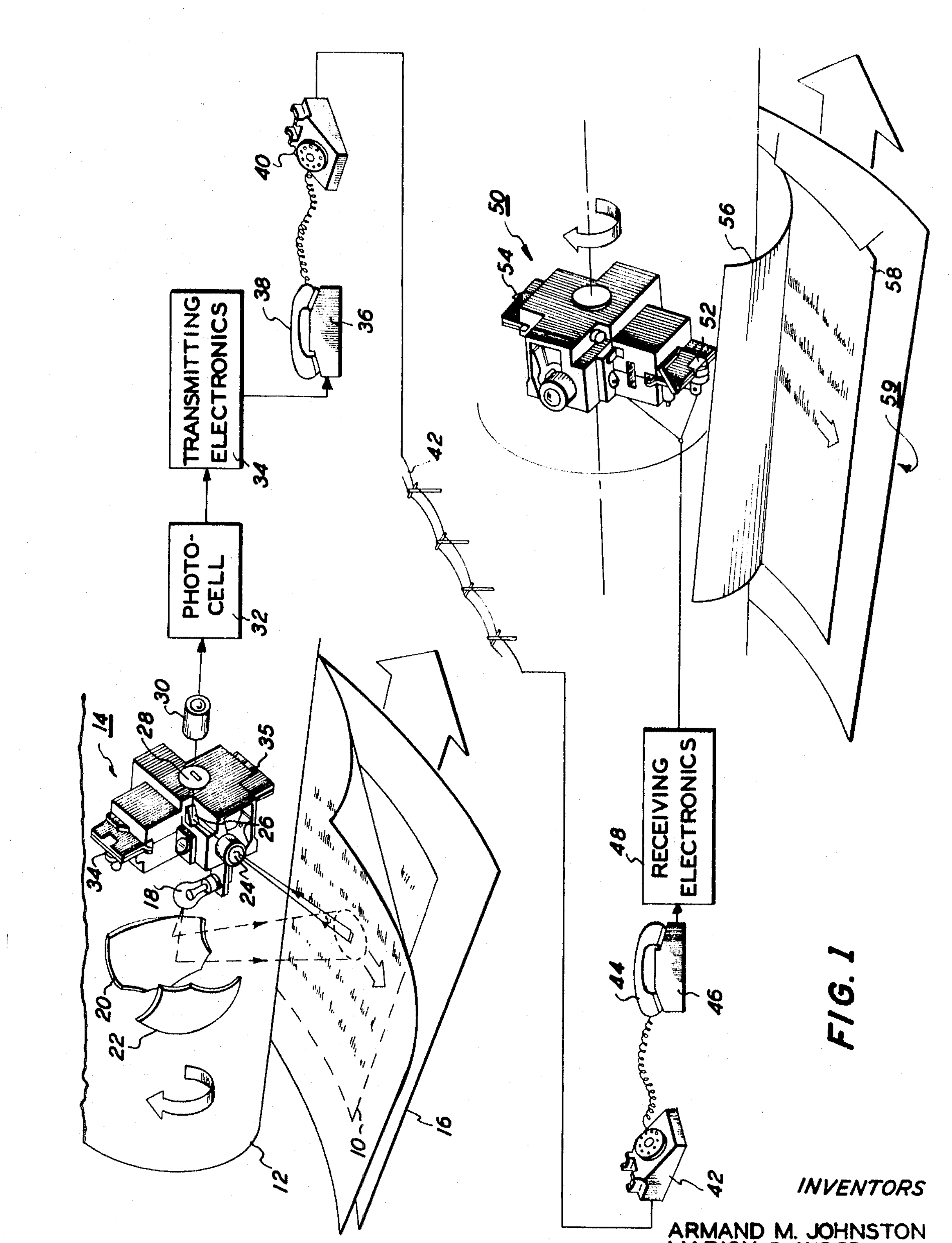
FIG. 1 is a partly isometric view of a facsimile transceiver system utilized in the present invention.

Referring now to FIG. 1, there is shown in block diagram, partly isometric, the prior art facsimile transmission system that has the function of transferring the contents of an original document 10 over long distances through standard telephone transmission circuitry to produce a copy of the original document. In the transmit mode of the facsimile transceiver, the original document 10 is held by a platen 12 to be scanned by a rotating turret scanner unit 14. Where a document is of thin paper, is a valuable document, or is old and ragged, a transparent carrier 16 may be used to protect the document. A motor, not shown, is mechanically coupled to the turret scanner 14. In addition, through appropriate gearing, not shown, the document, with or without carrier 16, is advanced past the turret scanner 14 in the direction of the arrow.

In the scanning operation, illuminating bulb 18 is lit, with its filament passing through the axis of rotation of the turret scanner unit 14. This allows an equal amount of light to fall on the document in that it appears to the document as a point source of light. The light is directed onto document 10 by means of mirrors 20 and 22. The embodiment shown in FIG. 1 has provisions for scanning twice per revolution of the turret scanner 14. That is, diametrically opposed and at 90° apart from each other are the scanning and printing heads. Thus, for the lens 24, the light can be seen to eminate from light source 18 and reflected by elliptical mirror 20 onto the document 10. The arrows show the direction of rotation of the turret scanner 14, and thus the direction of scan across document 10. The light is reflected off document 10 and passes through the lens arrangement 24 upon prism 26. The light is reflected 90° by the prism 26 through an aperture 28 which determines the amount of light, i.e. resolution, of the scanning operation. Passing through the aperture 28, the light is then focused by lens 30 onto a photocell 32.

Also seen in the turret scanning unit 14 are the print heads 34 and 35. The oppositely opposed write heads and the scanning lenses allow for two scans per revolution inasmuch as the document does not completely wrap around the platen 12. Not seen but on the other side diametrically opposed from the lens 24 as shown is another lens which is used on the other half of each revolution.

The photocell 32 receives the information modulated light beam as detected from document 10 and produces a base band electrical signal which is used to energize transmitting electronics 35. The output of transmitting electronics 35 is a signal which is able to be transmitted over the normal common carrier telephone line. One such technique of transmitting the information is to convert the electrical signals derived from the information modulated light beam by photocell 32 into a frequency modulated signal in the frequency band able to be transmitted over the telephone lines. Other transmitting techniques may be utilized, all of which are within the skill of one knowledgeable in the art and may be found in the prior art. From the transmitting electronics 35, the signals now in the frequency pass band of the telephone lines are directed to acoustic coupler 36. This coupler 36 converts the information modulated signals into sound waves which can be detected by the transducer in the mouth piece in an ordinary telephone handset 38. This handset converts the sound waves detected generated by coupler 36 to the electrical signals which are actually transmitted over the telephone line through the telephone 40.

Shown diagrammatically are the telephone lines 42 which may or may not be above ground as shown but are merely representative of the common carrier telephone lines. At the other end of the transmission line, a similar telephone unit 42 receives the electrical signals and converts the transmitted electrical signals into acoustic energy by the transducer in the earpiece of a normal telephone handset 44. In a coupler 46, which is identical to coupler 36 at the transmitting end, the sound waves generated by the handset 44 are received and converted back to electrical signals for operation by the receiving electronics 48. In the receiving electronics 48 would be decoder circuits, equalization circuits for equalizing the distortion characteristics of the telephone lines, and other circuits necessary for proper operation of the transceiver. From the receiving electronics 48 are signals which are directed to the turret scanner 50 which would be identical to the turret scanner 14 at the transmitting location as shown in FIG. 1. Here, however, the optical part of the scanner would be inoperative and the printing signals received from receiving electronics 48 would be used to energize the write transducers 52 and 54, which give two scans per revolution of the turret scanner 50 in the direction of rotation as shown.

Inasmuch as the embodiment shown utilizes an impact printer, a specific type of recording medium must be utilized. As shown, a sheet of carbon paper is placed over a sheet of ordinary white paper, which is commonly termed a carbon set, and is advanced past the turret scanner 50 in the direction of the arrow shown. As the scanner is drawn across the carbon sheet 56, either writing transducer 52 or 54, which ever is in contact at a particular time, is energized and, depending upon the information received, the transducer will be caused to selectively impact the carbon paper 56 to cause a transfer of colorant depositing layer, i.e. carbon or colored ink to the sheet 58. When the scanning operation is completed, the output document 58 will be an exact facsimile of the original document 10 at the transmitting location.

As the units shown are facsimile transceivers, each unit is equally capable of transmitting or receiving. For example, an original document could be placed adjacent to optical scanner unit 50 and with the proper circuitry energized, signals could be transmitted to the transceiver which, in FIG. 1, is operating as a transmitter. To establish contact and transmit a document, an operator would merely pick up handset 38 from the telephone unit 40 and dial the telephone number of telephone 42 at the receiving location. Once contact had been made, and it was decided which location would be transmitting and which location would be receiving, the necessary operations can be commenced. For example, in FIG. 1, document 10 would be placed adjacent optical scanning unit 14 while at the printing location the operator would place the carbon set which comprises the carbon paper 56 and the white paper 58, adjacent to the scanning unit 50. The operator would then energize the proper receiving circuits and place the telephone handset 44 on the acoustic coupler 46. Similarly, the operator at the transmitting location, would energize the proper transmitting circuits and place his handset 38 on the coupler 36. Transmission would then commence and a facsimile would be generated at the receiving location of the original document present at the transmitting location. Proper phasing and synchronizing operations would occur but do not form a part of the present application.

If in the event a malfunction occurs in a particular facsimile transceiver, in the prior art a communication must be established between a compatible transceiver and such communication must occur in both directions in order to check the circuitry and apparatus involved. Even then, it cannot be conclusively determined that the particular transceiver is at fault because the signals transmitted may have been distorted by the remote transceiver or the transmission line facilities, or both. In addition, since the unit is a transceiver, first a transmitting operation must be conducted and then a receiving operation must be conducted in order to check both the transmitting and receiving circuits and apparatus. This is a waste of time of another transceiver which may or may not be on the same priority basis as the transceiver under question, in addition to the use of another operator at the remote location.

Figure 2:
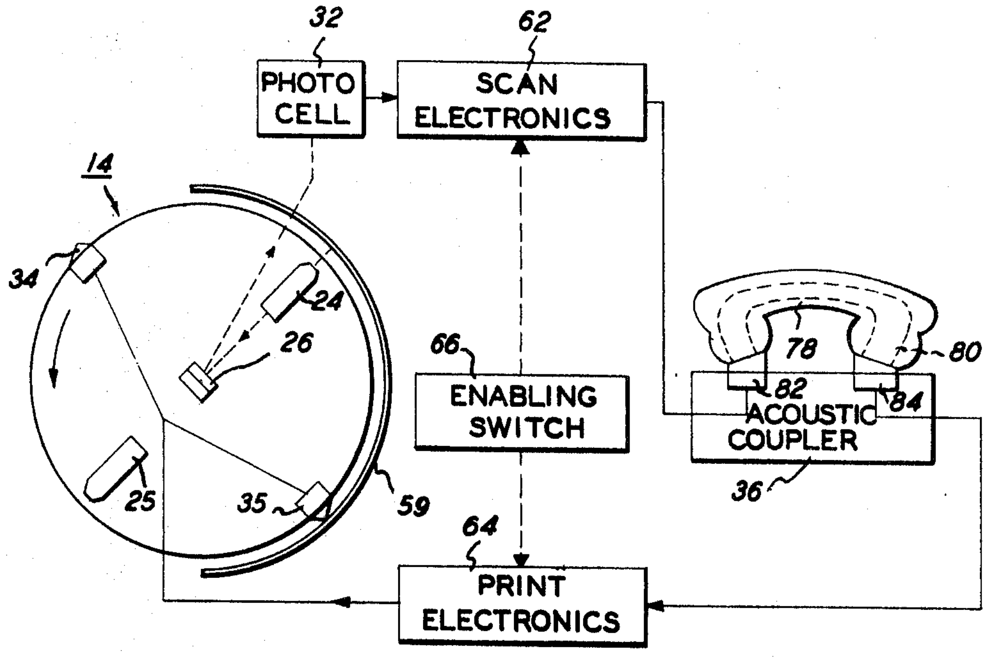
FIG. 2 is a representative block diagram of a single transceiver utilizing the principles of the present invention.

FIG. 2, therefore, shows the self-test apparatus incorporating the principles of the present invention. For ease of description, designations for components similar to that seen in FIG. 1 in conjunction with the transmitting transceiver will be used. Shown diagrammatically in FIG. 2 is the turret scanner 14 as a circle. The arrow shows the direction of rotation around the axis of the turret arrangement 14. Shown at the center of turret arrangement 14 is the prism 26 which receives the light from the document through lens arrangement 24 and reflects the light to photocell 32. Oppositely disposed on the turret scanner 14 is a similar lens arrangement 25, thereby allowing two optical scans per revolution of the turret scanner 14. Placed 90° from each of the lens arrangements 24 and also diametrically opposite each other on the turret scanner 14 are the print heads 34 and 35. As hereinbefore set forth, the print heads are electromagnetically operated in conjunction with information modulated signals to come in contact with the printing carbon set to impact it in accordance with the received information and generate the output reproduction facsimile.

Figure 3A:
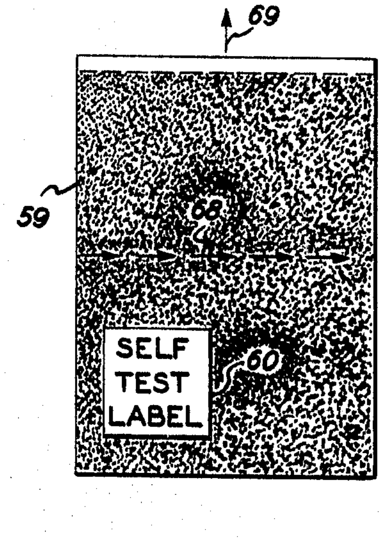
FIGS. 3A and 3B are representative diagrams of the test document with the best label affixed.

In FIG. 3A is a representative diagram of the self-test carbon set which comprises a top sheet of carbon paper and a undersheet of ordinary white bond paper with the self-test label. For ease of handling, the carbon set comprising the carbon paper and the bond paper, is attached at the top, which allows for quick separation when desired. For the self-test procedure, a label 60 is attached to the top layer carbon sheet with instructions or other information for the operator. For ease of illustration, however, printed on the label 60 are the words "-Self-Test Label." The carbon set with the label, herein termed a self-test document, is now placed adjacent the turret scanner 14 as would an ordinary document, seen in FIG. 1. With the direction of feed of the document shown by the arrow 69 in FIG. 3A and by the direction of rotation of the scan turret arrangement 14, shown by arrow 68, it will be seen that as an optical scan lens 24 is optically scanning the self-test label 60, at the same time the print scan head 34 will also be in contact with the print set document. This capability allows for simultaneous scanning and printing on the same print set, if the proper circuits are energized accordingly.

Figure 3B:
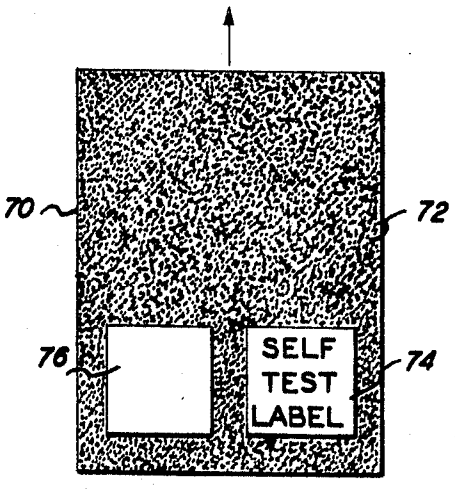

Normally, in ordinary operation of the transceiver, either the transmitting electronics or the receiving electronics is energized, but not both at the same time. Here, however, with the special self-test document, if the scan electronics 62 and the print electronics 64, which are included in the transmitting electronics 34 and receiving electronics 48 respectively in FIG. 1, are enabled at the same time by enabling switch 66 and associated circuitry, the test procedure may be accomplished. Therefore, noting both FIG. 2 and FIG. 3, it can be seen that as an optical scan lens scans the self-test document 59, in the direction of the arrows 68, when the portion of the scan reaches the self-test label 60, the label will be scanned by the optical scan lens 24 while the print head 34, for example, is still in contact with the self-test document 59. When the print head 34 leaves the document, the other scan head 25 is just coming into contact with document 59 and through the scan and print electronics, print head 35 impacts the document and prints out the information detected by the optical read head 25 on the self-test label 60. FIG. 3B shows the output document 70 with the carbon sheet removed. Area 72 is entirely black because the optical scanner in its scan path across the document detected only black information which was transferred to the print head 34 and 35 accordingly. When, however, the optical read heads reached the area of the self-test label 60, the information was transferred accordingly to the print heads and printed out at area 74. Area 76 remains white because the impact print heads 34 and 35 do not exert sufficient pressure through the label 60 to cause any appreciable transfer of carbon to the document 70. This is of no concern, however, because the information of interest is at the print area 74. An operator at this point can compare the print out information at area 74 with the information printed on the self-test label 60. If there is appreciable deviation in quality from the information printed at the print out area 74 from the information printed on the self-test label 60, then appropriate service procedures can be instigated. The operator can be sure, however, that the equipment at the operator's location is or is not defective and is not the fault of the transmission line or another transceiver with which communication is being conducted.

Referring back to FIG. 2, it can be seen that to transfer the information from the scan electronics 62 to the print electronics 64 would require a major reconnection of transceiver electronics. Normally the information is transmitted by the acoustic transducer in the acoustic coupler 36 to a telephone handset and then from a receive telephone handset back to the acoustic coupler to the receiving print electronics. Accordingly, it is seen in FIG. 2 that a dummy telephone handset 78 is provided. This telephone handset 78 is similar in appearance and size to the normal telephone handset. This is necessary, of course, to allow proper fit between the dummy handset 78 and the acoustic coupler 36. The dummy handset, however, contains no transducers or electric wiring as is normal in the standard telephone handset. Instead, however, the handset is hollow with a direct open path 80 from transducer 82 to transducer 84. Transducer 82 in the acoustic coupler is a transducer similar to the transducer in the earpiece of the normal telephone handset. Thus, it generates the acoustic energy through the open path 80 to transducer 84 which is a transducer similar to that in the mouthpiece of the normal telephone handset which converts acoustic energy to electric energy. The use of this dummy handset allows the complete use of the facsimile transceiver with the only modifications being the use of the enabling switch 66 and the associated circuitry to allow simultaneous operation of the scan and print electronics.

An operator, to reiterate, would merely place the self-test label on a standard carbon set, insert this self-test document into the transceiver, enable the scan and print electronics to allow simultaneous operation, place the dummy handset on the acoustic coupler and wait for the completion of the printing of the self-test document.

While the embodiment shown in FIG. 2 is described in conjunction with an acoustic coupler, any facsimile transceiver utilizing electric, inductive or other coupling would work as well. For instance, in a private telephone leased line system, where direct electrical connection from a transceiver to the line is permitted, then mere modification of the electrical coupling circuits to shunt the transmitting information directly to the print electronics in the receiver can be utilized.

There would be, accordingly, no change in the test procedures except possibly for circuit enabling in the electric or other type coupler rather than the placement of the dummy handset as seen in FIG. 2.

The facsimile transceiver described herein utilizes an optical scanner and an impact printer with an associated carbon set. Other substitutes for the carbon set may be utilized with the impact and other type printers. For example, the encapsulated color depositing system as patented by the National Cash Register Co. may be employed. The known types of electrolytic and electrostatic-printing techniques are also valid substitutions.

The foregoing specification and embodiments herein have been described in conjunction with the facsimile transceiver marketed under the trademark Telecopier by the Xerox Corporation in Rochester, New York. It is obvious, however, to one skilled in the art, that any facsimile transceiver utilizing any sort of scanning or print out capability can be utilized without deviating from the principles of the present invention. Thus, it would be understood by those skilled in the art that various changes may be made and equivalents may be substituted for elements thereof without departing from the true spirit and scope of the invention. In addition, many modifications may be made to adapt a particular situation to the principles of the invention without departing from its essential teachings.

What we claim is:

1. In a graphic communication system comprising a facsimile transceiver for transmitting and receiving video signals representative of information on a document or the like, the method of self-testing said facsimile transceiver comprising the steps of simultaneously enabling both the transmit and receive capabilities of said transceiver, detecting a predetermined pattern on a test document, and printing said predetermined pattern on said test document, whereby the quality of said printed predetermined pattern is an indication of the quality of operation of said transmit and receive capabilities of said transceiver.

2. The method of testing the operation of a facsimile transceiver used for transmitting and receiving information-modulated electrical signals representative of information on a document or the like comprising the steps of affixing on a record medium a predetermined test pattern, said recording medium with said test pattern comprising a test document, scanning said test document to detect said test pattern thereon, and printing on said test document the test pattern simultaneously with the scanning of said test document, whereby the quality of the printing in comparison with the test pattern is an indication of the effectiveness of the transceiver operation.

3. A facsimile transceiver system comprising a scanner and printer and including scan and print circuitry operating in conjunction with said scanner and printer in the respective modes thereof, comprising:

means for energizing said scan circuitry and said print circuitry so that said scan and print circuitry are simultaneously operable, means for coupling the output of said scan circuitry to the input of said print circuitry, and a record sheet that is simultaneously scanned by said scanner and printed upon by said printer, the print quality on said record sheet being an indication of the effectiveness of the operation of said facsimile transceiver.

4. The system as set forth in claim 3 wherein said coupling means comprises an electric coupler, said electric coupler allowing direct electrical coupling from the output of said scan circuitry to the input of said print circuitry upon proper enabling thereof.

5. The system as set forth in claim 3 wherein said coupling means comprises an inductive coupler, said inductive coupler including first means for inductively converting the output of said scan circuitry into electric video signals, and second means for inductively converting electric video signals into input electrical signals for application to said print circuitry.

6. A facsimile transceiver system comprising a scanner and printer and including scan and print circuitry operating in conjunction with said scanner and printer in the respective modes thereof, comprising:

means for energizing said scan circuitry and said print circuitry so that said scan and print circuitry are simultaneously operable, means for coupling the output of said scan circuitry to the input of said print circuitry, said coupling means comprising an acoustic coupler, said acoustic coupler including first means for converting the output of said scan circuitry into audio signals representative thereof, and second means for converting audio signals into input electrical signals for application to said print circuitry, and record means for being simultaneously scanned by said scanner and printed upon by said printer, whereby the effectiveness of the operation of said facsimile transceiver can be monitored thereby.

7. The system as set forth in claim 6 further including dummy telephone handset means for coupling the audio signals from said first converting means to the second converting means, said dummy telephone handset means comprising a hollow tube in the configuration of a telephone handset for allowing a close physical and audio relationship with said acoustic coupler.

8. In a facsimile information scanning and printing transceiver system, a recording medium for testing the operation of said facsimile transceiver comprising:

sheet means for receiving the information to be printed, and label means attachable to said sheet means for providing a predetermined pattern to be scanned and simultaneously reproduced as said information on said sheet means, the quality of the reproduced pattern being an indication of the operativeness of said facsimile transceiver.

9. The recording medium as set forth in claim 8 wherein said sheet means comprises a first and second member in intimate coplanar relationship, said first member comprising a colorant-depositing layer adjacent to said second member, whereby the colorant is depositable onto said second member to generate said reproduced pattern, and wherein said label means is attached to the side of said first member opposite said colorant-depositing layer.

10. The recording medium as set forth in claim 9 wherein said colorant-depositing layer is colored ink.

11. The recording medium as set forth in claim 9 wherein the colorant-depositing layer is encapsulated colored fluid.

12. In a graphic communication system comprising a facsimile transceiver for transmitting and receiving video signals representative of information on a document or the like wherein said transmitting and receiving functions are simultaneously operable in a test mode, a record medium for testing the operation of said facsimile transceiver comprising:

sheet means for receiving the information to be recorded, and a test pattern on said sheet means to be scanned and simultaneously reproduced on said sheet means, the quality of the reproduced pattern being an indication of the operativeness of said facsimile transceiver.

13. In a graphic communication system comprising a facsimile transceiver for transmitting and receiving video signals representative of information on a document or the like, apparatus for self testing said facsimile transceiver comprising:

means for simultaneously enabling both the transmit and receive capabilities of said transceiver, means for detecting a predetermined pattern on a test document, and means for printing said predetermined pattern on said test document, whereby the quality of said printed predetermined pattern is an indication of the quality of operation of said transmit and receive capabilities of said transceiver.

14. A facsimile transceiver for transmitting and receiving information-modulated electrical signals representative of information on a document or the like, apparatus for testing the operation of said facsimile transceiver comprising:

a test document comprising a record medium with a predetermined test pattern thereon, means for scanning said test document to detect said test pattern, and means for printing on said test document the predetermined test pattern simultaneously with the scanning of said test document, the quality of the printing in comparison with the test pattern being an indication of the effectiveness of the transceiver operation.

15. In a graphic communication system comprising a facsimile transceiver for transmitting and receiving video signals representative of information on a document or the like wherein said transmitting and receiving functions are simultaneously operable in a test mode, the method of testing the operation of said facsimile transceiver by a record medium with a test pattern thereon comprising the steps of:

scanning and simultaneously printing on said record medium said test pattern, the quality of the reproduced pattern being an indication of the operativeness of said facsimile transceiver.